C. SCHLUMBERGER.
PROCESS FOR DETERMINING THE NATURE OF THE SUBSOIL BY THE AID OF ELECTRICITY.
APPLICATION FILED JAN. 2, 1913.

1,163,468.

Patented Dec. 7, 1915.

2 SHEETS—SHEET 1.

Witnesses:

Inventor,
Conrad Schlumberger
May Georgii
his Atty.

C. SCHLUMBERGER.
PROCESS FOR DETERMINING THE NATURE OF THE SUBSOIL BY THE AID OF ELECTRICITY.
APPLICATION FILED JAN. 2, 1913.

1,163,468.

Patented Dec. 7, 1915.
2 SHEETS—SHEET 2.

UNITED STATES PATENT OFFICE.

CONRAD SCHLUMBERGER, OF PARIS, FRANCE.

PROCESS FOR DETERMINING THE NATURE OF THE SUBSOIL BY THE AID OF ELECTRICITY.

1,163,468.   Specification of Letters Patent.   Patented Dec. 7, 1915.

Application filed January 2, 1913. Serial No. 739,728.

*To all whom it may concern:*

Be it known that I, CONRAD SCHLUMBERGER, of 7 Rue Las Cases, Paris, France, engineer, have invented a new and useful Improvement in Processes for Determining the Nature of the Subsoil by the Aid of Electricity, which improvement is fully set forth in the following specification.

The purpose of the present invention is to provide a method whereby to determine the nature of the sub-soil of a tract of land and to detect and localize minerals, or deposits, stone layers, and the like, below the surface, without the necessity of digging or excavating.

For this purpose the invention consists in the steps, mode of proceeding, and features now to be described.

The accompanying drawings illustrate more or less diagrammatically the method of the present invention as well as apparatus suitable for carrying out the same in practice.

Figure 1:
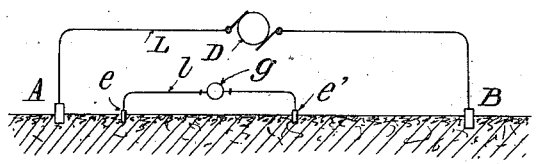
Figure 2:
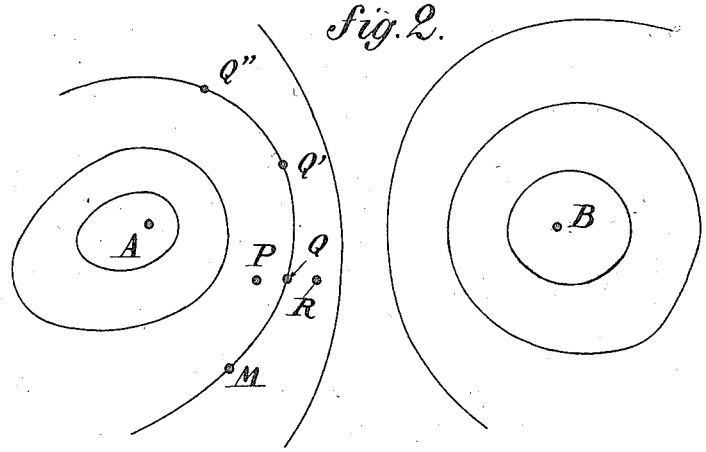
Figure 4:
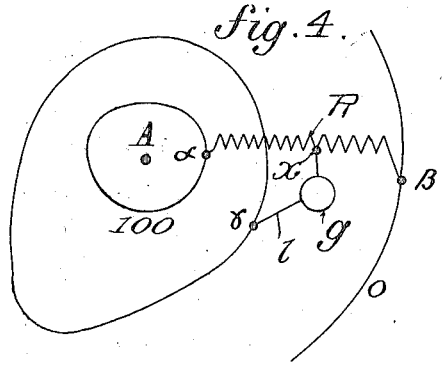
Figure 3:
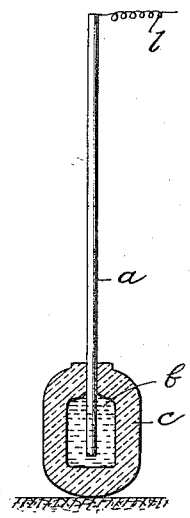
Figure 5:
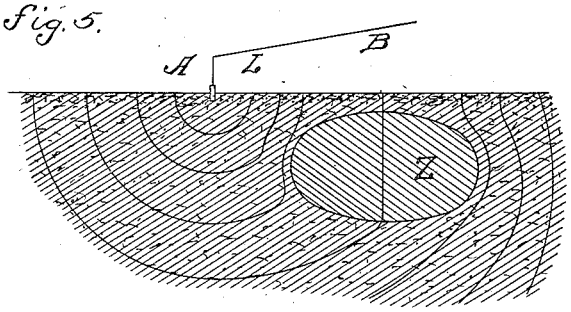
Figure 6:
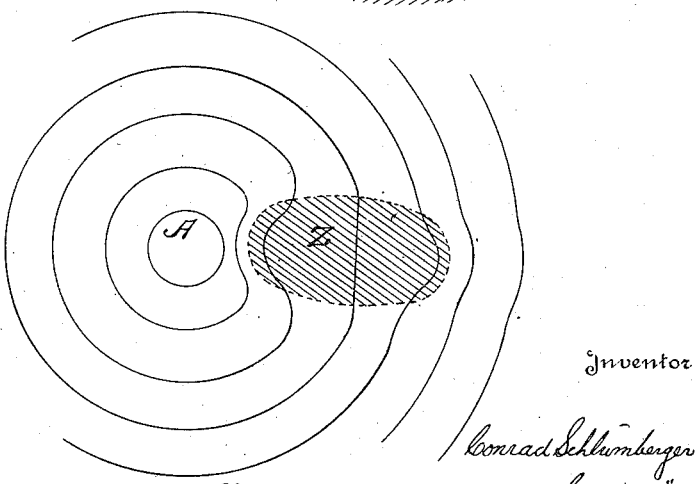

In these drawings: Figure 1 is a diagram showing a typical arrangement of the apparatus in practice; Fig. 2 is a diagram illustrating the method of locating an equipotential curve; Fig. 3 is a view, partly in section, of a type of electrode used in carrying out the method of the invention; Fig. 4 illustrates diagrammatically the method of determining the relative potential of points on an equipotential curve, and Figs. 5 and 6 illustrate in vertical section and plan, respectively, a typical distribution of equipotential surface and curves in a specific instance.

In the first place, two points A and B on the surface of the ground are selected, and a constant or variable difference of potential is applied between them. A series of equipotential curves are then plotted around the said points A and B. The chart of equipotential curves so obtained, which may be likened to a topographical chart provided with curves of equal altitude, will serve to determine the distribution of the electric current in the interior of the earth between the points A and B, so far at least as this is possible by observations at the surface. The chart will, in particular, furnish important data for determining the heterogeneities of the sub-soil with relation to electrical conductivity. From this valuable deductions may be made with regard to the geological nature of the said sub-soil, whether the heterogeneous character of the same be due to electrolytic causes, such as variations in the water or moisture contained in the land, or to the presence of metals or conducting minerals such as magnetite, pyrites, galena, or other conducting material.

In order to apply a difference of potential between the points A and B of the ground (see Fig. 1), a suitable source D of electricity is employed, such, for example, as a continuous current dynamo-machine. The poles of this source of electricity are connected by an insulated conductor L with earth terminals arranged at the points A and B. Each of these earth terminals or leads may consist, for example, of a group of metal pegs, or stakes, which are driven into the ground and connected with the conductor L.

In order to determine and plot the curves of equal potential, a portable conductor $l$ (see Fig. 1) is employed, an apparatus for indicating the electric current, for example a galvanometer $g$, being included in said conductor. The conductor $l$ terminates in two electrodes $e$ $e'$, which are adapted to be brought into contact with the ground.

The manner of proceeding is as follows: At a given point M of the ground, the electrode $e$ is inserted and thereafter the other electrode $e'$ is brought into contact with the ground at a series of different points P, Q, R, etc., the galvanometer being inspected each time. The galvanometer will show a deviation under the influence of the difference of potential applied between A and B each time that the point of the ground in contact with the electrode $e$ has not the same potential as the point M at which the other electrode $e$ is grounded. When, however, the electrode $e'$ has been brought into contact with a point of the ground having the same potential as the point M, no deviation of the galvanometer occurs. In Fig. 2, it is assumed that the point Q located in this manner is of equal potential with the point M, said point Q lying between the points P and R, which show opposite deviations on the galvanometer. In the same manner a sufficient number of further points having the same potential are located, for example the points Q', Q''. By plotting all the points having the same potential upon a map of the region in question, and connecting them by a line, the corresponding equipotential curve will be obtained. In carrying out this method in practice, a number of disturbing causes must be taken into consideration. For example, if two ordinary electrodes consisting of two metal spikes or stakes are driven into the soil and are connected by a conductor, a galvanic element is formed in which the moist or wet ground takes the part of the electrolyte. The electro-motive force of such an element is ordinarily in the neighborhood of a few tenths of a volt, because the metals of both stakes are never exactly identical in character. Moreover, this electromotive force will of course be very variable, since the least current traversing the circuit produces the polarization of the stakes by reason of electrolysis. For this reason, and under these circumstances, it is not possible to introduce a sensitive galvanometer into the conductor without obtaining a considerable deviation of the needle and even subjecting the same to injury. It is, therefore, impossible to observe small potential differences on the surface of the earth with the arrangement above set forth. In order to remove this difficulty I construct and arrange the electrodes $e\ e'$ in a special manner. As shown in the drawing, Fig. 3, each of these electrodes consists of a rod $a$ of copper which extends into a concentrated solution $b$ of copper-sulfate, which is contained in a porous receptacle $e$. This porous receptacle is the only part of the electrode which comes into contact with earth. Manifestly the rod forming the electrode may be made of other metal than copper, and may extend into a solution of a suitable salt of the metal of which it is formed. With the electrode formed in this manner it is possible to decrease the electro-motive force of the galvanic element formed by the two electrodes, the earth, and the conductor, sufficiently to reduce it to only a few millivolts. This value remains substantially constant, because the current passing through the electrodes $e\ e'$ while in contact with earth, can neither polarize the electrodes nor otherwise modify them appreciably.

Another disturbing factor is due to the earth currents which are continually passing through the earth's crust and which also cause the galvanometer to deviate even when no difference of potential is applied between the points A and B, such deviations increasing with the length of the conductor $l$. The errors of observation due to such earth currents, as well as to the residual slight electromotive force between the electrodes $e\ e'$, are eliminated by periodically reversing the difference of potential between the points A and B, and reading off on the galvanometer only these deviations which are due to such reversals, and which are always readily distinguishable from the deviations due to earth currents, by virtue of their regular occurrence.

To be able to give to the equipotential curves their correct and complete significance, it is necessary to number them according to the relative value of their respective potentials, in a manner similar to that employed on topographical charts where the altitude curves are numbered according to their respective values. The numbering adopted is only relative, for the reason that the potential drop between any two given curves of equal potential on the chart, is always more or less variable during the experiment, so that it would be inaccurate to indicate these potential drops in absolute quantities, for example, in volts. For practical purposes, it is entirely sufficient to know merely the relative drops of potential between the different curves. In order to measure these relative drops of potential, the method indicated in Fig. 4 may be employed. The potential of an equipotential curve designated $\alpha$ is designated as 100, for example, and the potential of another equipotential curve $\beta$ at a considerable distance from the point A is given the arbitrary value zero. The drop in potential between the curves $\alpha$ and $\beta$ therefore amounts to 100 arbitrary units. If we now take an equipotential curve $\gamma$, situated between the equipotential curves $\alpha$ and $\beta$, the number to be given it will be obtained by expressing the drop of potential between $\gamma$ and $\beta$ in the units adopted for expressing the drop of potential between $\alpha$ and $\beta$. This number may be obtained by a method of measurement, in which an arrangement in the manner of a Wheatstone bridge, is employed. Between the two equipotential curves $\alpha$ and $\beta$ is introduced a conductor containing a high resistance R, 100,000 ohms, for example. This bridge carries a derived current from $\alpha$ to $\beta$ the potential along this conductor decreasing in proportion to the resistance. A point on the equipotential curve $\gamma$ is then connected with a point $x$ on the resistance R, a galvanometer $g$ being introduced into the conductor $l$ connecting the two points. The extremity of the conductor $l$ at the point $x$ is then moved along the resistance R until the galvanometer indicates zero, which means that $\gamma$ and $x$ have the same potential. For example, assuming that for this position of the point $x$ the 100,000 ohms of the resistance are divided in such a manner that a resistance of 35,000 ohms exists between the point $x$ and the equipotential curve $\beta$, the drop of potential between $x$ and $\beta$ will be equal to 35/100 of the entire potential drop between $\alpha$ and $\beta$, and consequently the curve $\gamma$ will be designated with the numeral 35. In order to avoid the disturbances first described when employing this method, the non-polarizable electrodes described above must be employed and the deviations of the galvanometer must be read off by employing the method of reversal of current between the points A and B as above described. With the aid of the chart of potentials thus obtained, deductions may be made with regard to the interior conductivity of the region represented on the chart, and therefrom with regard to the geological nature and structure of the sub-soil thereof. A potential chart thus plotted is independent, first of the mean specific conductivity of the ground, secondly, of the absolute value of the difference of potential applied between the points A and B, which may be constant or variable, and, thirdly, of the nature of the connections to earth in A and B. This is true as well for the form of equipotential curves as for their numbering, so that the potential chart of the region in the vicinity of the points A and B is entirely independent of the character or the behavior of the measuring apparatus, and of all experimental contingencies.

The equipotential curves are the lines of intersection of the surface of the earth with the equipotential surfaces extending into the interior of the earth. Where the ground is homogeneous these surfaces may be ascertained by calculation, whereby it is possible to obtain the equipotential curves for the surface by such theoretical calculations in the case of homogeneous territory. If we assume the points A and B to be located at a considerable distance from each other, as will be the case in practice, it will be true that the equipotential curves in the vicinity of A or B will approximate very closely to circles for homogeneous ground, said circles being described around the points A or B as their centers. The equipotential surfaces extending into the earth will accordingly approximate very closely to hemispheres.

Now, if it is assumed that the ground is not homogeneous, but contains a conductive mass Z near the point A, (see Figs. 5 and 6) the equipotential surfaces will not be hemispheres, but will have deviations or deformations in the neighborhood of the conductive mass. These deformations or distortions of the equipotential surfaces will naturally be present also in the equipotential curves at the surface. The deviations or distortions of the equipotential curves at the surface, as a rule are of such a character that these curves are reëntrant or concave over the point of the conductive mass which is nearest the point A, while the equipotential curves lying over the opposite end of the said mass are curved outward, forming protuberances. The equipotential curves lying over the middle of such mass are however deformed to a relatively small extent. This condition of the equipotential curves is represented in Figs. 5 and 6 of the drawing. It is hence clear that the form of the equipotential curves determined by the above method furnishes means whereby to readily ascertain the position and the extent of a conductive mass in the ground. The depth at which such conductive masses are located in the ground may also be readily ascertained by a chart as above prepared, in view of the fact that the equipotential curves of a small radius are formed by spherical surfaces of small radius which surfaces penetrate into the ground to a relatively small depth. Hence these surfaces will not be materially influenced by masses which are located at considerable depth. Hence such masses will influence only curves of a great radius.

For carrying out the method above set forth, it is sufficient to employ a plant or apparatus of normal efficiency and such as can readily be obtained on the market. For example, in order to produce the potential difference required, between the points α and β, a dynamo machine from one to two kilowatt power furnishing a continuous current of from 200 to 400 volt will be effective.

What I claim and desire to secure by Letters Patent, is:

1. The process of determining the nature of the sub-soil, which consists in maintaining a difference of potential between two points on the surface of a given tract, plotting a chart indicating the equipotential curves with relation to the two points, and then comparing the equipotential curves thus obtained with the curves of an equipotential chart calculated with reference to the said two points for homogeneous soil.

2. The process of determining the nature of the sub-soil, which consists in maintaining a difference of potential between two points on the surface of a given tract, periodically reversing the current between the said two points to eliminate disturbances by earth currents or polarization at the electrodes, plotting a chart indicating the equipotential curves with relation to the two points and then comparing the equipotential curves thus obtained with the curves of an equipotential chart calculated with reference to the said two points for homogeneous soil.

3. The process of determining the nature of the sub-soil, which consists in maintaining a difference of potential between two points on the surface of a given tract, plotting a chart indicating the equipotential curves in the vicinity of the two points, measuring the relative drop of potential between the different equipotential curves, then comparing the curves and figures thus obtained with the theoretical equipotential curves and figures calculated for homogeneous soil.

4. Apparatus for determining the nature of the sub-soil comprising a pair of unpolarizable electrodes connected by an insulated line containing a galvanometer.

5. Apparatus for determining the nature of the sub-soil comprising a pair of unpolarizable electrodes connected by an insulated line containing a galvanometer, each of said electrodes comprising a rod of substantially pure metal connected to said line, and a porous receptacle containing a solution of a salt of said metal into which said rod dips, said porous receptacle being arranged to prevent contact of said rod with earth.

6. In apparatus for determining the nature of the sub-soil, an electrode comprising a rod of metal and a porous receptacle containing a solution of a salt of said metal into which said rod dips, said porous receptacle being arranged to prevent contact of said rod with earth.

In testimony whereof I have signed this specification in the presence of two subscribing witnesses.

CONRAD SCHLUMBERGER.

Witnesses:
LUCIEN MEMMINGER,
PRÉDÉVI HARTÉ.